United States Patent [19]

DeLay, Jr.

[11] Patent Number: 4,557,395
[45] Date of Patent: Dec. 10, 1985

[54] PORTABLE CONTAINER WITH INTERLOCKING FUNNEL

[75] Inventor: Victor A. DeLay, Jr., Largo, Fla.

[73] Assignee: E-Z Out Container Corp., Clearwater, Fla.

[21] Appl. No.: 717,439

[22] Filed: Mar. 28, 1985

[51] Int. Cl.⁴ ............................................. B65D 3/04
[52] U.S. Cl. .............................. 220/86 R; 220/85 F; 220/1 C; 141/98
[58] Field of Search ............... 220/86 R, 85 F, 1 C; 141/98, 331; 220/360

[56] References Cited

U.S. PATENT DOCUMENTS

| | | | |
|---|---|---|---|
| 1,554,589 | 9/1925 | Long | 220/1 C X |
| 3,410,438 | 11/1968 | Bartz | 220/1 C |
| 4,010,863 | 3/1977 | Ebel | 220/1 C |
| 4,149,575 | 4/1979 | Fisher | 220/85 F X |
| 4,162,020 | 7/1979 | Kirkland | 220/1 C X |
| 4,296,838 | 10/1981 | Cohen | 220/1 C X |
| 4,301,841 | 11/1981 | Sandow | 220/1 C X |

Primary Examiner—Steven M. Pollard
Attorney, Agent, or Firm—Stanley M. Miller

[57] ABSTRACT

A portable, vented container for dirty oil, of the type having a small fill spout and having increased utility when used in conjunction with a funnel. A vent closure member and a funnel securing latch are integral with the funnel so that when the funnel is inverted and positioned in surmounting relation to the container, the vent closure member closes the vent and the securing latch is engaged by a fill spout cap which engagement secures the funnel against movement and hence maintains the vent closure as well. Removal of the fill spout cap releases the funnel, and positioning the funnel into its operative position relative to an automotive oil drain plug separates the vent closure portion of the funnel from the vent. An elongate extension member having a flexible medial portion is further provided.

20 Claims, 12 Drawing Figures

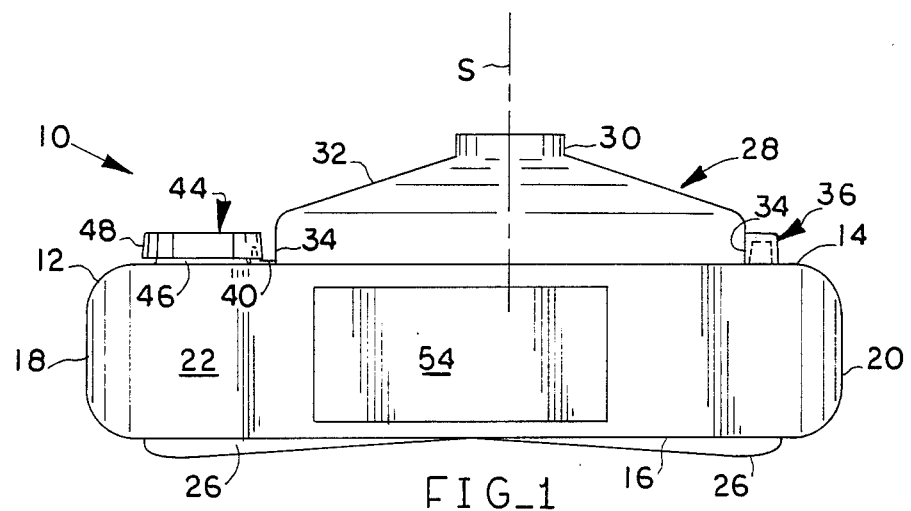
FIG_1
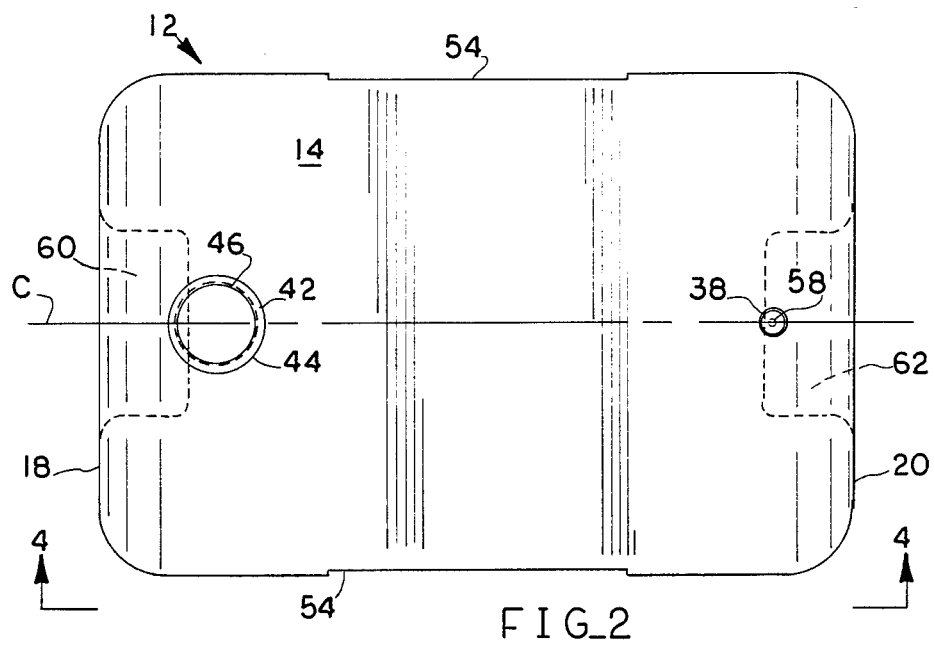
FIG_2
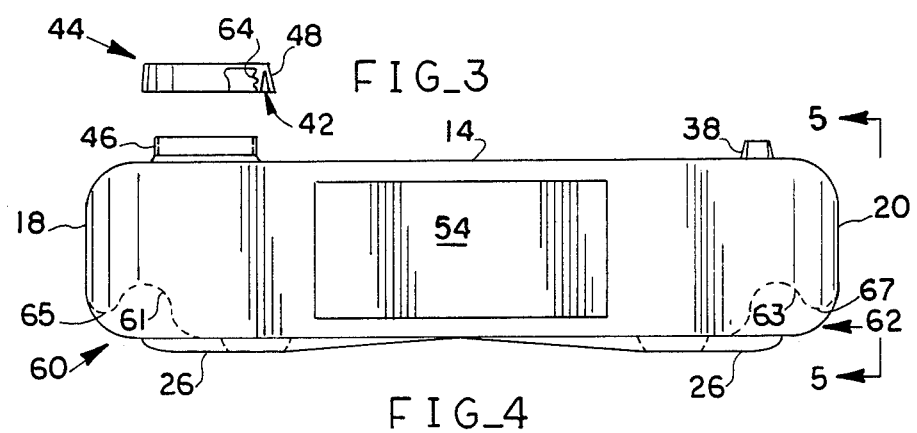
FIG_3
FIG_4

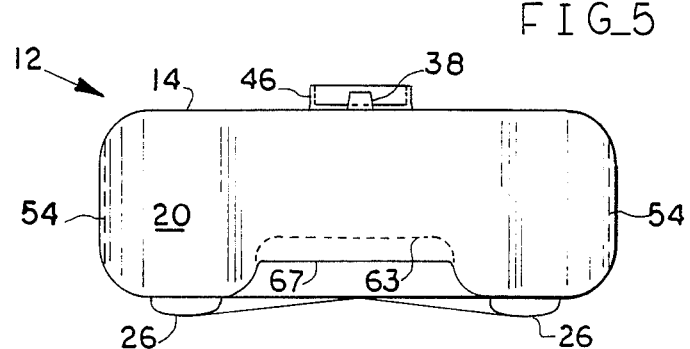
FIG_5
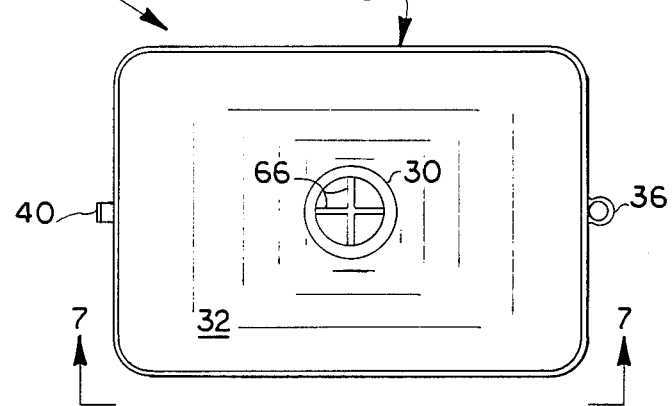
FIG_6
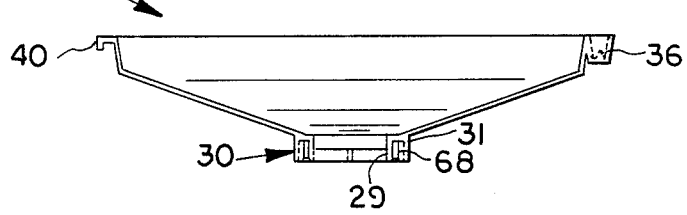
FIG_7
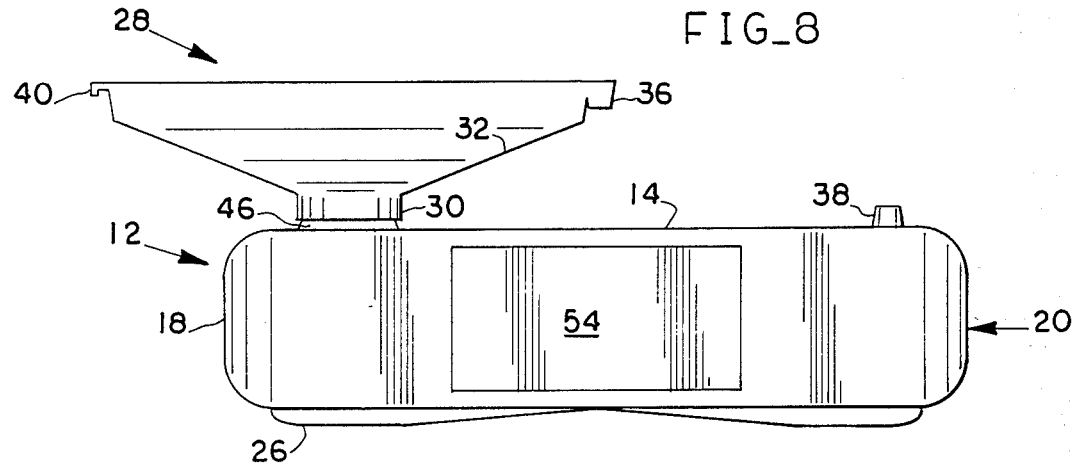
FIG_8

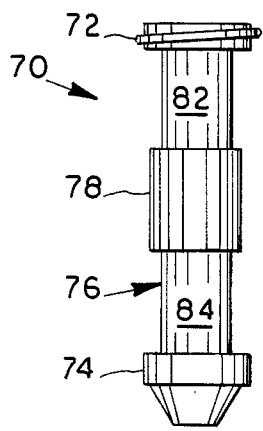
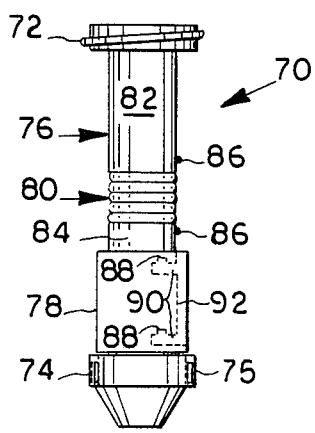
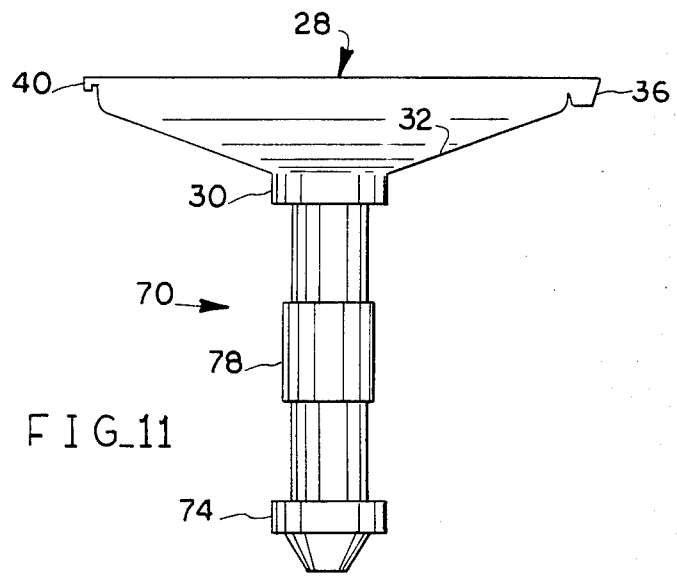
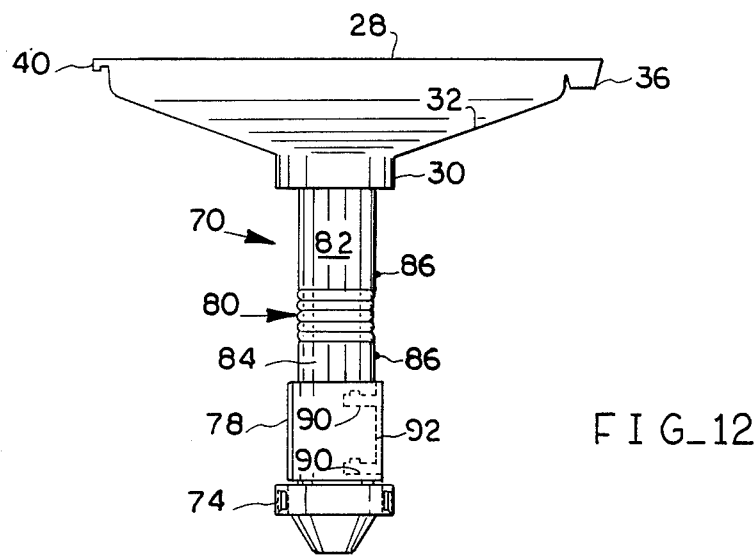

PORTABLE CONTAINER WITH INTERLOCKING FUNNEL

BACKGROUND OF THE INVENTION

1. Field of the Invention

This invention relates generally to containers having small fill spouts, and more particularly this invention relates to a vented container the vent of which is closed when the funnel is stored in latching engagement with the container body.

2. Description of the Prior Art

A thorough description of the prior art in the the field to which this invention pertains may be found in my co-pending application having a filing date of Sept. 14, 1983, Ser. No. 06/531,948. Moreover, the most pertinent prior art is believed to be the container for dirty oil disclosed in said application.

Other patents of interest are: U.S. Pat. Nos. 4,403,692 to Pollacco (1983); 822,854 to Cosgrave (1906); 2,576,154 to Trautvetter (1951); 4,098,393 to Meyers (1978); 4,217,940 to Wheeler and others (1980); and 4,301,841 to Sandow (1981).

Of the known containers, only the container provided by the present inventor and disclosed in the above-identified patent application contains a means whereby the funnel of the container can be conveniently stored when not in use.

Containers having small fill spouts are normally vented to allow the air inside the container to escape as liquid fluids are charged thereinto. Typically, the vent is provided in the form of an upstanding coupling which is provided with a closure member in the form of a cap which may or may not be attached to the coupling itself. Where the cap is attached to the coupling, its loss is safeguarded against but still the user of the container must remember to open and close the vent as needed. Vent caps that are not attached to their couplings are usually lost.

There is a need, therefore, for a vent cap that is safeguarded against loss, and which also opens and closes the vent as needed without requiring the user thereof to remember to open and close such vent.

Another common problem with small-mouthed containers is that the funnels which must be used therewith are often lost. Pollacco solves this problem by permanently securing his funnel to his container. This storage expedient is unsatisfactory because it is important to maintain funnels of the type used to fill automotive crankcases in a substantially clean condition as the introduction of dirt into a crankcase can damage engine parts.

Therefore, there is a need for a funnel storage apparatus capable of storing a funnel in an inverted position when it is not in use. The storage apparatus that is needed would also safeguard against the loss of the funnel.

The art has heretofore developed elongate funnel extension members of the type disclosed by Cosgrave, Trautvetter, and the present inventor, but the same are inflexible and thus inadequate and lacking in utility in certain specific environments.

SUMMARY OF THE INVENTION

The longstanding but heretofore unfulfilled need for a portable container for dirty oil having the desireable features of a self-opening and self-closing vent, a funnel that is storable in an inverted position and which is also secured against loss, is now fulfilled by the invention disclosed hereinafter and summarized as follows.

The container is of parallelepiped form and has finger-receiving recesses formed in its opposite ends, on the underside thereof, which recesses are grasped by an individual when transporting the container.

The top of the container includes a large, imperforate medial portion against which the rim of the funnel is seated when the funnel is in its storage position.

A fill spout of small diameter projects upwardly from the top of the container, and is disposed near the periphery of the container so the medial portion of the container can receive the stored funnel, as aforesaid.

A sleeve member which defines a vent opening projects upwardly from the top of the container as well, but is disposed in longitudinally spaced relation to the fill spout so that it is near the periphery of the container opposite from the fill spout.

The longitudinal axis of symmetry of the container bisects the finger-receiving recesses or handles, the fill spout, the vent-defining sleeve, and the funnel when the latter is in its stored position. In this manner, the container is stable when transported.

The funnel has an integral vent closure member that projects outwardly from the rim of the funnel, in radial relation to the funnel's axis of symmetry. A latch member used to secure the stored funnel against movement is also formed integral to the funnel, extends radially with respect to said axis from the rim thereof, and is positioned in opposition to the vent closure member.

The funnel's size and the amount of space between the fill spout and the vent opening are selected so that when the funnel is inverted and placed in the center of the medial portion of the top wall of the container, and properly rotated about its axis of symmetry, the vent closure member will align with and seal the vent opening and the latch which is opposed to the vent closure member will be positioned in close proximity to the fill spout.

A novel fill spout closure member in the form of a double-walled cap, when brought into screw threaded engagement with the fill spout, will seal the spout and simultaneously overlie the funnel latch to secure the funnel against displacement.

The novel cap's first wall is internally threaded and thus adapted for screw threaded engagement with the externally threaded fill spout. It outer wall defines an annular recess having an open bottom, which recess surrounds the first wall and which recess receives the funnel latch therewithin. The annular configuration of the recess eliminates any need for aligning the cap with respect to the latch.

In this manner, the act of inverting the funnel and placing it in its storage position on the top wall of the funnel will close the vent if the proper alignment is made. Once the vent has been closed, no further alignment is required as the sealing of the fill spout by the novel cap will also secure the funnel as desired.

Thus, when the funnel is deployed into its operative configuration, the user of the invention need only remove the fill spout cap, as such will release the funnel from its stored position. The act of placing the funnel's spout into the container's fill spout then serves to open the vent.

A funnel extension member having a flexible medial portion is also disclosed hereinafter. A slideably mounted rigid sleeve member serves to delete the flexibility function of the extension member when desired when such sleeve member is positioned in registration with the flexible portion of the member. However, the flexibility of the member is restored upon slidingly displacement of the sleeve away from the flexible medial portion.

An important object of this invention, therefore, is to provide a container for dirty oil that includes a funnel as an attachment to the container so that the funnel is not easily misplaced.

Another object is to provide an attachment means that protects the sloping inside walls of the funnel contamination when the funnel is stored.

Another object of this invention is to provide a means whereby the vent of a container can be automatically opened and closed at the time the container's funnel is placed into its operative position and its storage position, respectively.

Other objects will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a side elevational view of the container with the funnel stored in its inverted position thereatop;

FIG. 2 is a top plan view of the container body member;

FIG. 3 is a partially cut away side elevational view of the novel fill spout closure means;

FIG. 4 is a side elevational view taken along line 4—4 of FIG. 2;

FIG. 5 is an end view taken along line 5—5 of FIG. 4;

FIG. 6 is a top plan view of the novel funnel member;

FIG. 7 is a side elevational view of the funnel member taken along line 7—7 of FIG. 6;

FIG. 8 is a side elevational view, like that of FIG. 4, which shows the funnel member engaging the fill spout of the container body;

FIG. 9 is a side elevational view of the novel funnel downspout extension member with the rigid sleeve in its locked position;

FIG. 10 is a side elevational view of the funnel downspout extension member with the rigid sleeve in its unlocked position;

FIG. 11 is a side elevational view showing the extension member operatively coupled to the funnel member with the sleeve in its locked position; and FIG. 12 is a side elevational view showing the extension member operatively coupled to the funnel member with the sleeve in its unlocked position.

Similar reference numerals refer to similar parts throughout the several views of the drawings.

DETAILED DESCRIPTION OF THE PREFERRED EMBODIMENT

Referring now to FIG. 1, it will there be seen that an illustrative embodiment of the invention is designated by the reference numeral 10 as a whole. The container body 12 has a parallelepiped construction when seen in perspective. Visible in FIG. 1 are the container's top wall 14, bottom wall 16, its left and right end walls 18, 20, a side wall 22, and support members collectively designated 26.

The novel funnel is indicated generally by the numeral 28. Funnel 28 includes downspout 30, sloping or converging walls 32, and an annular rim 34.

A vent closure member 36 is integrally formed with the rim 34 and extends therefrom as shown. The closure member 36 overlies a vent shroud 38 which is shown in phantom lines in FIG. 1.

A latch 40 is also integrally formed with the funnel rim 34 and is on the opposite side thereof relative to the vent closure member 36. The latch 40 has an "L" shape as shown. The horizontal leg of the latch abuts the top wall 14 of the container 12 and extends radially with respect to the axis of symmetry S of the funnel 28. It terminates in an upstanding leg (shown in phantom lines in FIG. 1) that extends into a cavity 42, which cavity 42 is an annular recess as shown in FIG. 2.

Referring again to FIG. 1, fill spout cap 44 is internally threaded to mate with the external threads of the fill spout 46. The annular latch-receiving recess 42 is formed by the provision of annular wall 48 that surrounds the spout 46, said annular wall depending to the periphery of the top wall of cap 44. The diameter of the top wall of cap 44 is greater than the diameter of the fill spout 46 by an amount substantially equal to the width of the latch-receiving recess 42.

The placement of the upstanding portion of latch 40 in the annular cavity 42 maintains the funnel 28 in its inverted, stored position until the cap 44 is removed.

The space designated 54 in FIG. 1 is a display space and accommodates a label which may have imprinted thereon the trademark of the device and other information.

Returning now to FIG. 2, it will there be seen that the longitudinal axis of symmetry of the device 10 is indicated by the centerline C. It bisects the vent 58 which is formed in the top wall 14 of the container 10 and which is surrounded by vent shroud 38, the fill spout 46, and the longitudinally spaced handles 60, 62 of the invention. The width of the handles 60, 62 is sufficient to accommodate four fingers of a human hand. Both of the label-accommodating recesses 54, 54 mentioned in connection with the description of FIG. 1 are shown in FIG. 2 as well.

The vent closure member 36 slideably and snugly engages the outer walls of the shroud 38, thereby closing the vent opening 58, when funnel 28 is in the inverted storaage position, as aforesaid.

FIG. 3 shows the internal threads 64 on the cap 44 and the annular wall 48 that depends to the periphery of the cap top wall to define the annular cavity 42 into which the upstanding portion of latch 40 extends.

The externally threaded fill spout 46 is shown in FIG. 4, which FIG. shows the container 12 with funnel 28 and cap 44 separated therefrom.

The handles 60, 62 include concave surfaces 61, 63, respectively, and convex surfaces 65, 67, the former of which are abutted by fingertips when the container is carried and the latter of which provide a comfortable rounded weight bearing surface.

An end view of the container 12 is provided in FIG. 5.

A top view of the novel funnel 28 appears in FIG. 6. A strainer 66 formed by a pair of cross bars is formed where the downwardly sloping walls 32 of the funnel 28 merge with the funnel's downspout. The generally rectangular planform of the funnel 28 conforms to the planform of the container body 12 as shown in FIG. 2, but the corresponding dimensions of the funnel are smaller.

The downspout 30 of funnel 28 is internally threaded as indicated by the reference numeral 68 appearing in FIG. 7, and is thus adapted for screw threaded engagement with the externally threaded fill spout 46. Accordingly, the downspout 30 of the funnel 28 is coupled to fill spout 46 when it is desired to charge the container with dirty oil. This operative positioning of the funnel 28 and fill spout 46 is depicted in FIG. 8. A comparison of FIGS. 1 and 8 indicates that the removal of cap 44 from spout 46 releases latch 40 so that funnel 28 can be separated from its engagement with top wall 14 of container 12, restored to its upright configuration, and coupled with the spot 46. The separation of the funnel 28 and the container body top wall 14 also separates the vent closure member 36 from vent shroud 38, which separation exposes vent 58 (FIG. 2) to ambient. The internal threads 68 of downspout 30 are formed in outer wall 31 thereof. An inner wall 29 is spaced radially inwardly of outer wall 31, and is concentric therewith. Accordingly, dirty oil contacts inner wall 29 only.

The truncate downspout 30 of funnel 28 is provided because some vehicle are built close to the ground. However, other vehicles are built higher from the ground and the use of a downspout extension member becomes advisable.

An improved downspout extension member is shown in FIGS. 9–12, and is designated 70 as a whole. It includes an externally threaded adapter 72 which is coupled to the internally threaded downspout 30 of funnel 28 when in use, as shown in FIGS. 11 and 12. Another adapter 74 at the lower end of the extension member 70 is internally threaded as at 75 (FIG. 10) to mate with the external threads of the fill spout 46. An elongate medial portion 76 interconnects the upper and lower adapters 72 and 74.

A slideably mounted rigid sleeve member 78 is shown mid-length of the medial portion 76 in FIG. 9. When the sleeve member 78 is locked into this position by means disclosed hereinafter, the novel extension member 70 can be used in the same manner as conventional downspout extension members, which use is depicted in FIG. 11.

However, when the sleeve 78 is unlocked and slideably displaced to its lowermost position, which position is depicted in FIG. 10, such displacement frees a flexible member 80 from confinement so that it is free to bend. More specifically, upper portion 82 of the downspout extension member medial portion 76 and lower portion 84 thereof may be displaced from their axial alignment with each other, i.e., their respective axes of longitudinal symmetry may be made oblique to one another. As shown in FIG. 12, when the flexible member 80 is free, funnel 28 can be moved in any direction relative to lower coupling 74, or vice versa.

FIGS. 10 and 12 both show the means employed to lock and unlock sleeve 78 as desired. A pair of vertically spaced beads, collectively designated 86, are formed on upper and lower portions 82, 84 of the extension member medial portion 76. A pair of vertically spaced bead-receiving cavities, collectively designated 88, are formed internally of sleeve member 78, so that the sleeve 78 is locked into overlying relation to the flexible member 80 when beads 86 are disposed therein.

To unlock the sleeve 78, the user of the inventive apparatus grasps sleeve 78 and slides it upwardly by a distance equal to the depth of the bead-receiving cavities 88. Each bead 86 will then be positioned in channels 90 which are also formed internally of sleeve 78. The user of the device then rotates the sleeve 78 until the beads 86 have traveled the length of the arcuate channels 90, which length could be a quarter of an inch, for example. This rotation of sleeve 78 will bring the beads 86 into registration with a vertically extending channel 92 so that the sleeve 78 can be moved to the position shown in FIGS. 10 and 12.

It will thus be seen that the objects set forth above, and those made apparent from the foregoing description, are effectively attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A container of the type having a small fill spout and having increased utility when used in conjunction with a funnel, comprising:
    a container body member of generally parallelepiped configuration,
    a fill spout formed in a top wall of said container body member and projecting upwardly therefrom,
    a vent means in the form of an aperture formed in said top wall,
    a funnel member having a rim, converging sidewalls, and a downspout,
    said fill spout and funnel downspout adapted for releasable engagement with one another,
    a vent closure member secured to said funnel rim and projecting outwardly therefrom,
    said vent closure member closing said vent when brought into registration therewith.

2. The container of claim 1, further comprising,
    a fill spout closure means in the form of a cap member,
    a latch member secured to and projecting outwardly from said funnel rim,
    said cap member adapted to releasably engage said latch member when said funnel member is inverted and disposed atop said container top wall and when said cap member is releasably engaged to said fill spout.

3. The container of claim 2, wherein said vent closure member and said latch member are secured to said rim in opposed relation to each other.

4. The container of claim 3, further comprising,
    a sleeve-shaped shroud member disposed in surrounding relation to said aperture and projecting upwardly from said container top wall,
    said vent closure member adapted to engage said shroud member when said funnel is inverted and said vent closure member is brought into releasable engagement with said shroud member.

5. The container of claim 4, further comprising,
    a first handle means formed in said container body member at a first end thereof, a second handle means formed in said container body member at a second end thereof which is longitudinally spaced from said first end, each of said first and second handle means defined by a concavity formed in the bottom wall of said container body member and by a convexity contiguous thereto and continuous therewith, said convexity merging with an end wall of said container body member.

6. The container of claim 5, wherein the depth of the concavity forming a handle means is greater than the height of the convexity contiguous thereto.

7. The container of claim 5, wherein said first and second handle means are disposed transverse to and are bisected by the longitudinal axis of symmetry of said container body member.

8. The container of claim 3, wherein said cap member has a top wall having a diameter greater than the outer diameter of said fill spout, wherein an annular wall depends to the periphery of said cap top wall, wherein an annular cavity is defined between said fill spout and said depending wall, and wherein said latch member is specifically configured to enter into said annular cavity when brought into registration therewith.

9. The container of claim 8, wherein said latch member has a generally L-shaped configuration.

10. The container of claim 3, wherein said fill spout, said vent and said funnel member, latch member and vent closer member are collectively aligned with the longitudinal axis of symmetry of said container body member when said funnel member is inverted, when said vent closure member is disposed in engaging relation to said vent, and when said latch member is disposed in engaging relation to said fill spout cap.

11. The container of claim 1, wherein a strainer means is positioned within said funnel member at the juncture of said converging sidewalls and said downspout.

12. The container of claim 1, wherein said funnel member has a generally rectangular configuration when seen in plan view, and wherein said latch member and vent closure member are disposed mid-length of the opposite truncate sidewalls of said funnel member.

13. The container of claim 1, wherein said fill spout is externally threaded and wherein said funnel member downspout is internally threaded.

14. The container of claim 1, further comprising, an elongate funnel downspout extension member having a first end adapted to releasably engage said funnel downspout and a second end adapted to releasably engage said fill spout, and said downspout extension member having a flexible medial portion.

15. The container of claim 14, further comprising, a rigid sleeve-shaped locking member, having a length greater than the length of said flexible medial portion and having an inside diameter slightly greater than the outside diameter of said downspout extension member, disposed in ensleeving relation to said flexible medial portion and restricting said downspout extension member from flexing at said medial portion.

16. The container of claim 15, further comprising, means for selectively locking and unlocking said sleeve member into and out of its restricting engagement with said medial portion, respectively.

17. The container of claim 16, wherein said means for selectively locking and unlocking said sleeve member includes a pair of vertically spaced bead members formed on said downspout extension member, one of which is positioned above said flexible medial portion and one of which is positioned below said flexible medial portion, and wherein said sleeve member has a pair of cooperatively spaced bead-receiving cavities formed therein, which cavities are interconnected by a vertical slot and which cavities are formed at the end of associated channels orthogonal to said vertical slot.

18. The container of claim 13, wherein said funnel member downspout further comprises a cylindrical outer wall within which said internal threads are formed, and a cylindrical inner wall spaced radially inwardly of said outer wall so that dirty oil contacts only said inner wall when the container is used.

19. The container of claim 18, wherein said downspout inner wall is concentric with said downspout outer wall.

20. The container of claim 19, wherein the spacing between said downspout outer and inner walls is sufficient to receive therebetween said externally threaded fill spout.

* * * * *